Jan. 16, 1923.

J. W. PETERSON ET AL.
LUBRICATING SYSTEM AND APPARATUS.
FILED FEB. 4, 1921.

1,442,093.

2 SHEETS—SHEET 1.

John William Peterson
Floyd L. Swanberg
INVENTORS.

BY

ATTORNEYS.

Jan. 16, 1923.

J. W. PETERSON ET AL.
LUBRICATING SYSTEM AND APPARATUS.
FILED FEB. 4, 1921.

1,442,093.

2 SHEETS—SHEET 2.

John William Peterson
Floyd L. Swanberg
INVENTORS.
BY
Bettum Bettum Hudnall & Decker
ATTORNEYS.

Patented Jan. 16, 1923.

1,442,093

UNITED STATES PATENT OFFICE.

JOHN WILLIAM PETERSON AND FLOYD L. SWANBERG, OF MILWAUKEE, WISCONSIN, ASSIGNORS TO THE RICHARDSON-PHENIX CO., OF MILWAUKEE, WISCONSIN, A CORPORATION OF WISCONSIN.

LUBRICATING SYSTEM AND APPARATUS.

Application filed February 4, 1921. Serial No. 442,354.

*To all whom it may concern:*

Be it known that we, JOHN WILLIAM PETERSON and FLOYD L. SWANBERG, citizens of the United States, residing at Milwaukee, in the county of Milwaukee and State of Wisconsin, have invented certain new and useful Improvements in Lubricating Systems and Apparatus, of which the following is a specification, reference being had to the accompanying drawing, forming a part thereof.

This invention relates to lubricating systems and apparatus and the object of the invention is to improve the construction and operation of lubricating systems and apparatus in the manner to be hereinafter described and claimed.

Figure 1:
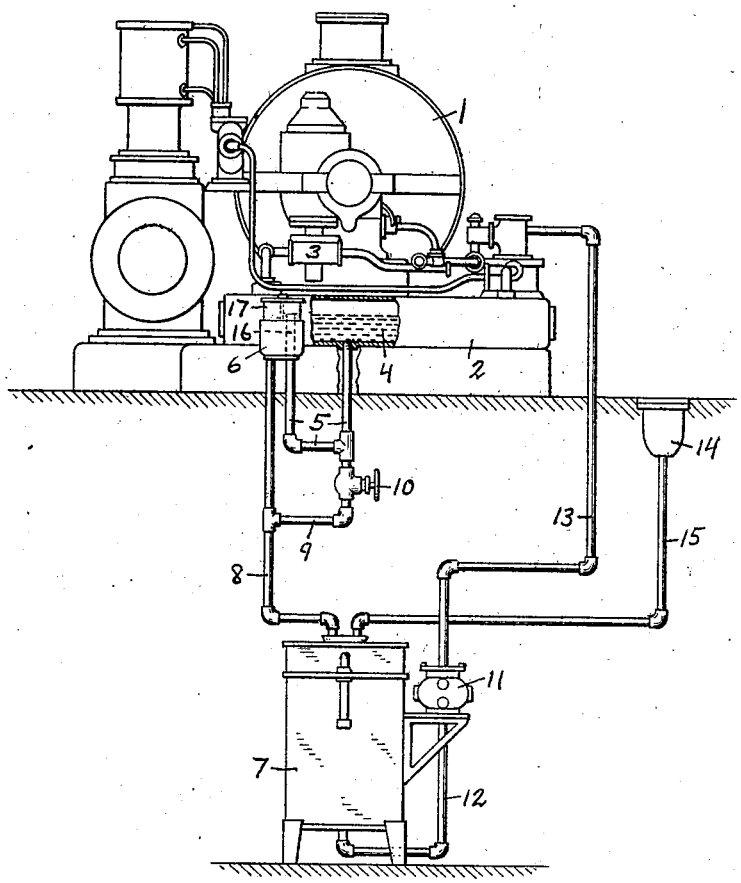
Figure 2:
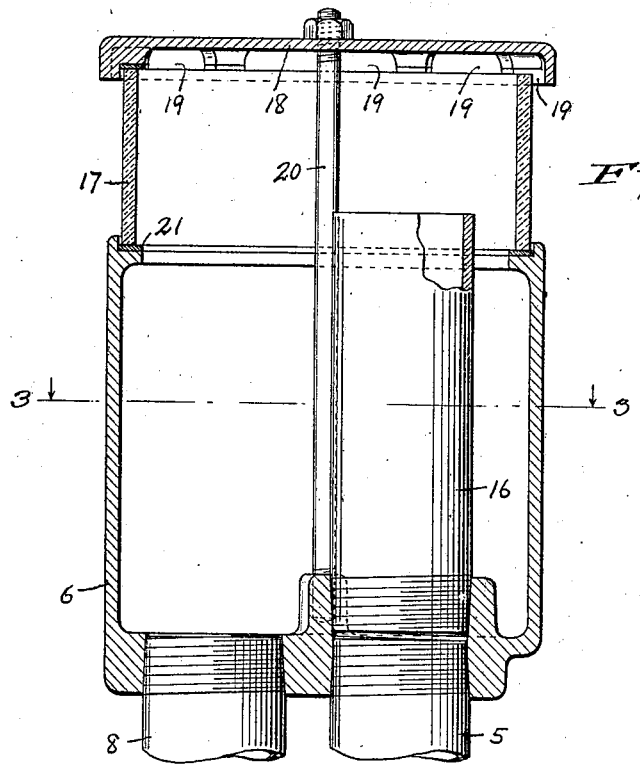
Figure 3:
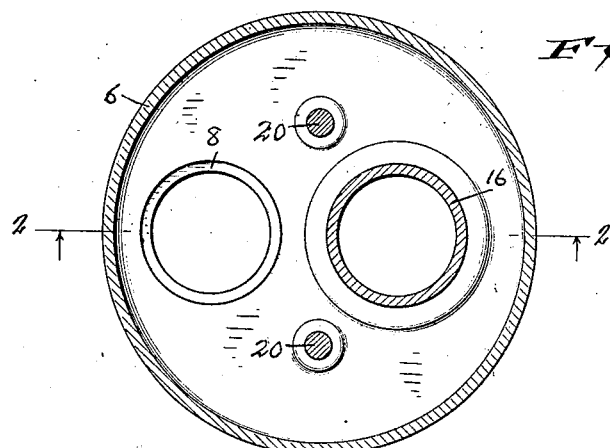

Referring to the drawings which accompany this specification and form a part hereof, which drawings illustrate an embodiment of this invention, and on which drawings the same reference characters are used to designate the same parts wherever they may appear in each of the several views, Fig. 1 is an elevation, a part being broken away, of a steam turbine with the lubricating system and apparatus; Fig. 2 is a vertical section of part of the apparatus of the lubricating system, the section being taken on the line 2—2 on Fig. 3, looking in the direction indicated by the arrows; and Fig. 3 is a horizontal section of the apparatus shown by Fig. 2, the section being taken on the line 3—3 on Fig. 2, looking in the direction indicated by the arrows.

Referring to the drawings, the reference numeral 1 designates a steam turbine and some associated adjuncts as an apparatus or mechanism to be lubricated. The steam turbine requires no description other than that it is provided with an oil or lubricant reservoir 2, a pump 3, and conduits or pipes through which the lubricant is pumped from the reservoir 2 to various parts to be lubricated. The lubricant is returned from the parts to be lubricated to the reservoir 2 and is thus used over and over again in a well known manner. Lubricant used in this manner becomes unfit for lubricating purposes for several reasons. Water becomes mixed with the lubricant, as well as solid impurities; air is mixed with the lubricant and the lubricant is otherwise affected in ways that it is not necessary to discuss at length here. If the lubricant can be properly purified before it has broken down or undergone too much physical or chemical change, its lubricating qualities can be retained for apparently an indefinite period, and the object of this invention is to provide a system and apparatus by means of which the lubricant can be properly purified without interfering with the lubrication of the apparatus to be lubricated. It is of the utmost importance that certain apparatus be operated continuously and for an indefinite period and a steam turbine has been selected as an example of such apparatus. Sometimes thousands of gallons of lubricant are contained in the lubricating system of such an apparatus. It is impracticable to purify the entire body of lubricant at one operation as, for example, by compelling the entire body of lubricant, in its circulation, to pass through a purifying apparatus, for failure of the purifying apparatus would endanger the apparatus to be lubricated, and, with most purifying apparatus and processes, some considerable time is required for the purification. One object of this invention is, therefore, to withdraw a part of the lubricant for purification without interfering with the lubrication of the apparatus to be lubricated and another object of this invention is to provide apparatus by means of which the first object can be accomplished. It will be noted, as this description proceeds, that the operation consists in removing a fractional part of the lubricant, purifying that fractional part of the lubricant and returning it to the main body of the lubricant, and continually repeating this operation. With such a cycle of operation, the average result will be that the entire body of lubricant will be purified and kept purified at all times to such a degree that its lubricating qualities will not become impaired.

An embodiment of the invention is illustrated by the drawings and the normal, predetermined level of the lubricant 4 in the reservoir 2 is clearly shown by Fig. 1 of the drawings. This predetermined lubricant level is maintained so that by no possibility can the apparatus to be lubricated be deprived of its lubricant. Lubricant in excess of the quantity required to maintain the predetermined level of lubricant can be removed for purification. The drawings illustrate the removal of the excess lubricant by gravity: the lubricant flowing from the reservoir 2 through the pipe 5, overflowing into the basin 6, and thence flowing to the purifier 7 through the pipe 8. A by-pass pipe 9, provided with a valve 10, permits all of the lubricant from the apparatus to be lubricated to be run to the purifier 7 in case it is deemed necessary or advisable. The lubricant may be filtered or physically or chemically treated or purified in any manner in the purifier 7 and is then returned to the apparatus to be lubricated by a pump 11 connected with pipes 12 and 13. Additional lubricant can be supplied through the receptacle 14 and pipe 15. As a matter of convenience in manufacturing, a part of the pipe 5, which is designated by the reference numeral 16, is made as a separate piece and secured to the bottom of the basin 6 and its upper end is placed at the level to be maintained by the lubricant in the reservoir 2 and where it can be seen through a glass cylinder 17 so that the flow of the lubricant can be readily observed. A cover 18 which is provided with air vent apertures 19 is secured by tie rods 20 to the basin 6 and the tie rods 20 hold the packing 21, the glass cylinder 17 and the cover 18 in assembled relation. The air vent apertures 19, by subjecting pipes 5 and 8 to atmospheric pressure, avoid the possibility of a siphoning action which might withdraw lubricant from the reservoir 2.

The construction and operation of the system and apparatus will be readily understood from the foregoing description. The excess lubricant in the reservoir 2 above the predetermined level which is determined by the upper end of the pipe 5, or its part 16, in the basin 6 will be automatically withdrawn by gravity to the purifier 7. The air vent apertures 19 will prevent any siphoning action which might tend to unduly drain the reservoir 2. The glass cylinder 17 is simply a transparent member which enables one to see the lubricant and determine whether it is overflowing properly.

What is claimed is:

1. In lubricating apparatus, the combination with a basin, of inlet and outlet pipes, one of said pipes extending up into the basin to determine an overflow level, a cover and a transparent member, an air vent aperture being provided to avoid the possibility of a siphoning action.

2. The combination in a lubricating system, of an apparatus to be lubricated provided with a lubricant reservoir and a circulating pump for the lubricant, a lubricant purifier, means for returning lubricant from the lubricant purifier to the apparatus to be lubricated, a basin, a transparent member and a cover secured to the top of said basin with an air vent aperture above the transparent member, pipe members leading from the bottom of the lubricant reservoir downwardly and thence upwardly within said basin, and a pipe connection from the bottom of said basin to the lubricant purifier.

In witness whereof we hereto affix our signatures.

JOHN WILLIAM PETERSON.
FLOYD L. SWANBERG.